Figure 1:
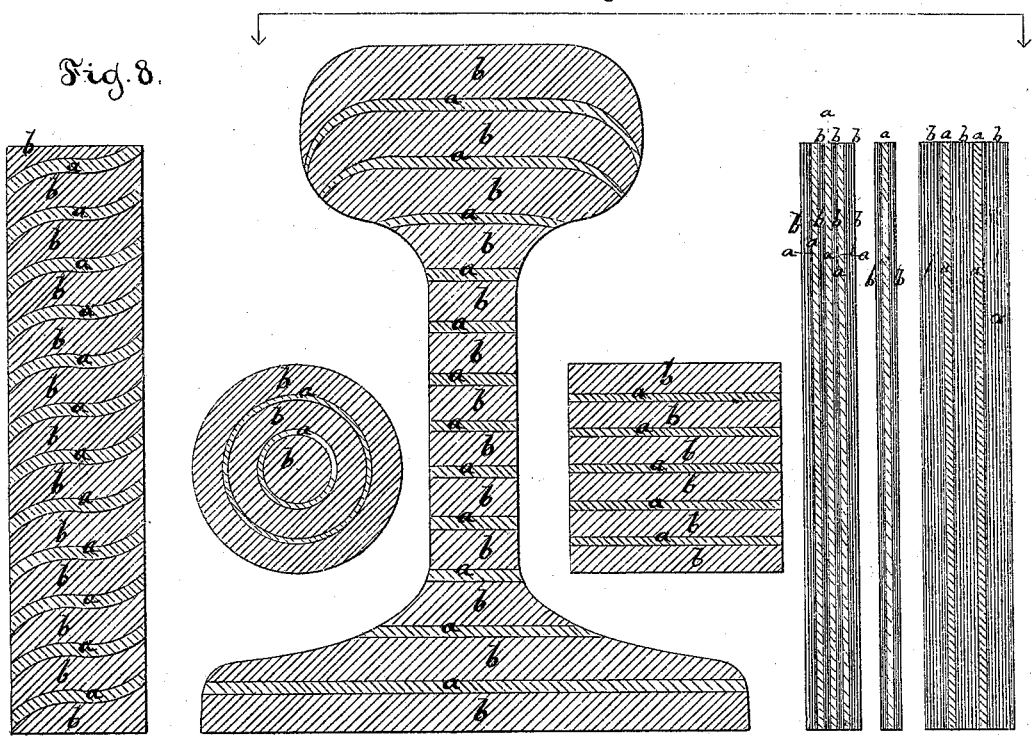

JOHN ABSTERDAM.
Improvement in the Manufacture of Iron.
No. 125,245. Patented April 2, 1872.

JOHN ABSTERDAM.
Improvement in the Manufacture of Iron.
No. 125,245. Patented April 2, 1872.

JOHN ABSTERDAM.
Improvement in the Manufacture of Iron.
No. 125,245. Patented April 2, 1872.

Witnesses.
C. Wahlers.
Ernst Bilhuber.

Inventor.
John Absterdam
per
Van Santvoord & Hauff
atty

JOHN ABSTERDAM.
Improvement in the Manufacture of Iron.
No. 125,245. Patented April 2, 1872.
4 Sheets--Sheet 4.
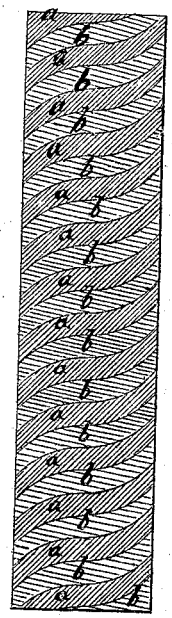
Fig. 11.
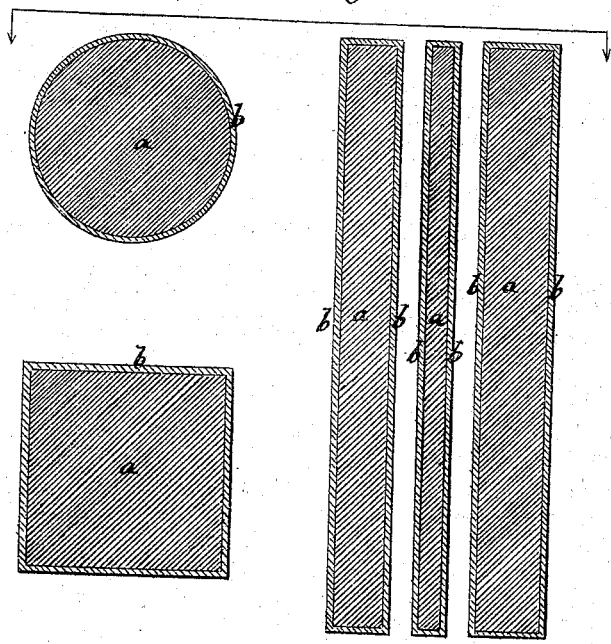
Fig. 7.
Fig. 9. Fig. 10.
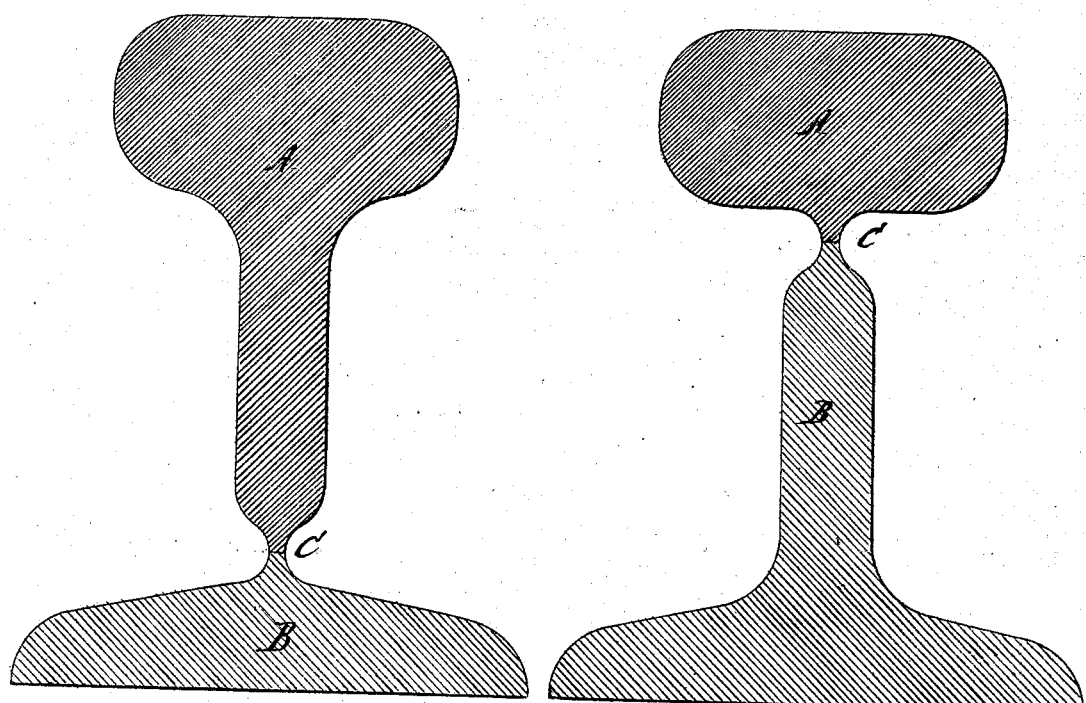
Witnesses.
Ernst Bilhuber
C. Wahlers.
Inventor.
John Absterdam No. 125,245

UNITED STATES PATENT OFFICE.

JOHN ABSTERDAM, OF NEW YORK, N. Y.

IMPROVEMENT IN THE MANUFACTURE OF IRON.

Specification forming part of Letters Patent No. 125,245, dated April 2, 1872.

*To all whom it may concern:*

Be it known that I, JOHN ABSTERDAM, scientific and mechanical engineer, of the city, county, and State of New York, have invented a new and useful Improvement in the Manufacture of Pneumatic and other Malleable Iron; and I do hereby declare the following to be a full, clear, and exact description thereof, which will enable those skilled in the art to make and use the same.

The nature of my invention consists in the process of producing iron bars with case-hardened surfaces by first subjecting the iron bars in a rough state to a process of case-hardening; then heating and passing them through the finishing-rollers in such a manner that bars are obtained of superior strength and better capable to resist oxidation; and, furthermore, the bars thus prepared are easily welded. My invention consists, further, in the process of producing merchantable bars, plates, sheets, or slabs of wrought-iron or pneumatic iron, or both combined, by first subjecting the rough bars of iron to a process of case-hardening, then fagoting, reheating, and rerolling the same, the process of case-hardening being intended to impart to bars of wrought-iron or of pneumatic iron the quality to weld readily under a white heat, and, consequently, to unite firmly with each other and with the wrought-iron, when being fagoted, reheated, and rerolled. My invention also consists in a merchantable bar, plate, sheet, or slab composed of wrought-iron or of pneumatic iron, when the rough bars of wrought-iron or pneumatic iron are first subjected to a process of case-hardening, and then reheated and passed through the finishing-rolls. My invention consists further in a merchantable bar, plate, sheet, or slab produced from bars of wrought-iron or of pneumatic iron, or both combined, when said bars are first case-hardened, then fagoted, reheated, and rerolled.

In order to enable others skilled in the art to make and use my invention, I will proceed to describe the process of manufacturing and the operation with its advantages.

The metal which is generally known by the term "Bessemer steel" is, in reality, nothing else but a homogeneous iron, and it is generally used only as a substitute for wrought-iron. The characteristic features which distinguish this metal from wrought-iron are that the same is produced directly from pig-iron by a powerful pneumatic blast passing through the molten mass, whereby the action of the oxygen of the air so thoroughly incorporates the remaining impurities with the iron, as to allow of casting the metal into ingots, said metal containing only a small proportion of carbon combined with the iron, while even the small quantity of 0.20 per cent. of carbon combined with iron imparts to the metal the quality of being cast in ingots. But the high temperature existing in the Bessemer process causes a part of the silicium, together with the sulphur, phosphorus, and other impurities, to combine with the oxygen, carbon, and iron, and a metal is produced of a dry nature under the influence of a white welding heat, in contradistinction to the pasty nature of wrought-iron under similar circumstances.

The dry nature of the pneumatic metal prevents it from welding in the pile or fagot into a united solid body, and in order to impart to the surface of said metal a pasty nature, or the desired welding quality, I subject the pieces of pneumatic metal to a process of case-hardening; then I construct the pile or fagot, and heat and roll or hammer the pile or fagot the same as is usually practiced with wrought-iron piles or fagots, with the exception that I manage the heat and allow the same number of passes through the rolls, as is now done in rolling pneumatic metal.

When it is desired to reroll old pneumatic Bessemer railway bars, or the sawed ends of new bars into merchantable bars, plates, sheets, or slabs, I cut and prepare the same into suitable pieces according to the kind of piles or fagots which is to be formed; and before forming the pile, I submit said pieces to a process of case-hardening by heating them to a red or white heat in contact with some carbonaceous substance, or in contact with some matter containing carbon in just the same manner in which wrought-iron is case-hardened, with the exception that I generally continue the process of case-hardening until a large number of small blisters make their appearance in the surface of the metal.

The carbon, in removing the oxygen and sulphur contained in the exterior of the metal, renders the surface of the same pasty under a welding heat, and the surfaces of the metal combine with the requisite amount of carbon to render them capable of being welded. When the pieces of pneumatic metal have been thus prepared, I form them in a pile or fagot, and by heating and rerolling them they become firmly united.

The same process is applicable for the purpose of rerolling old wrought-iron railway bars. In their natural state such old wrought-iron bars, being coated on their surfaces with oxide, are very difficult to weld, but, if said bars are cut in pieces of suitable length and case-hardened, the oxygen and sulphur are removed from the exterior of the iron, and a sufficient quantity of carbon is absorbed by the surface of the metal to impart to the same the required welding properties. After the pieces of old wrought-iron have been thus prepared, I form a pile or fagot of suitable shape, and heat and hammer or roll the same in the manner in which old railway bars are now rerolled.

The case-hardened pieces of wrought-iron are used on the exterior of the pile as well as on its interior, and since the exterior pieces, constituting the pile or fagot, can be case-hardened to any desired depth, I am enabled to produce bars, plates, sheets, or slabs from said pile or fagot, having alternate layers of case-hardened metal of any desired thickness, according to the quality of the metal which I desire to manufacture.

Figure 2:
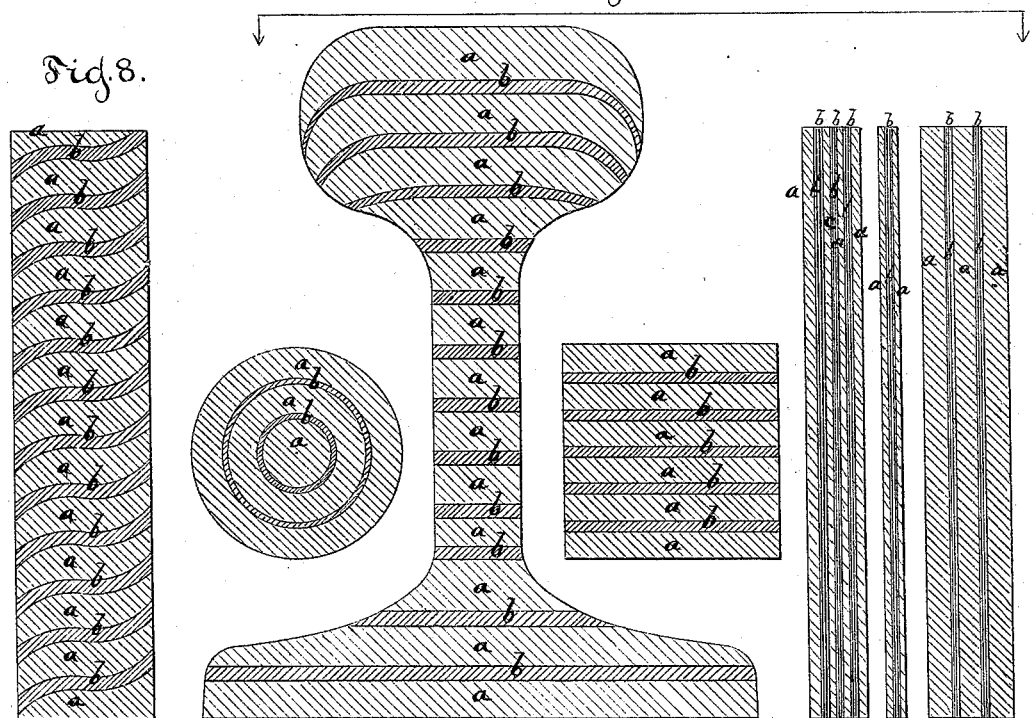

If the object of case-hardening is simply to impart welding properties to the metal only a superficial thickness of case-hardening is required, and if the pieces of metal so case-hardened are formed into a pile or fagot and then heated and rolled, I produce bars, plates, sheets, or slabs, having interlayers of case-hardened metal, as represented in the cross-section, Fig. 1, where the letters $b$ designate the iron, and the letters $a$ the intermediate layers of case-hardened metal. But when the object of case-hardening consists of imparting additional strength to the articles so manufactured, besides imparting welding properties to the metal, then I case-harden the pieces of iron to be used in the pile or fagot to a greater depth, and when the pile or fagot is formed, heated, and rerolled, bars, plates, sheets, or slabs are produced having thick interlayers of case-hardened metal, as represented in the several cross-sections shown in Fig. 2, where the letters $b$ designate the iron, and the letters $a$ the layers of case-hardened metal.

Figure 3:
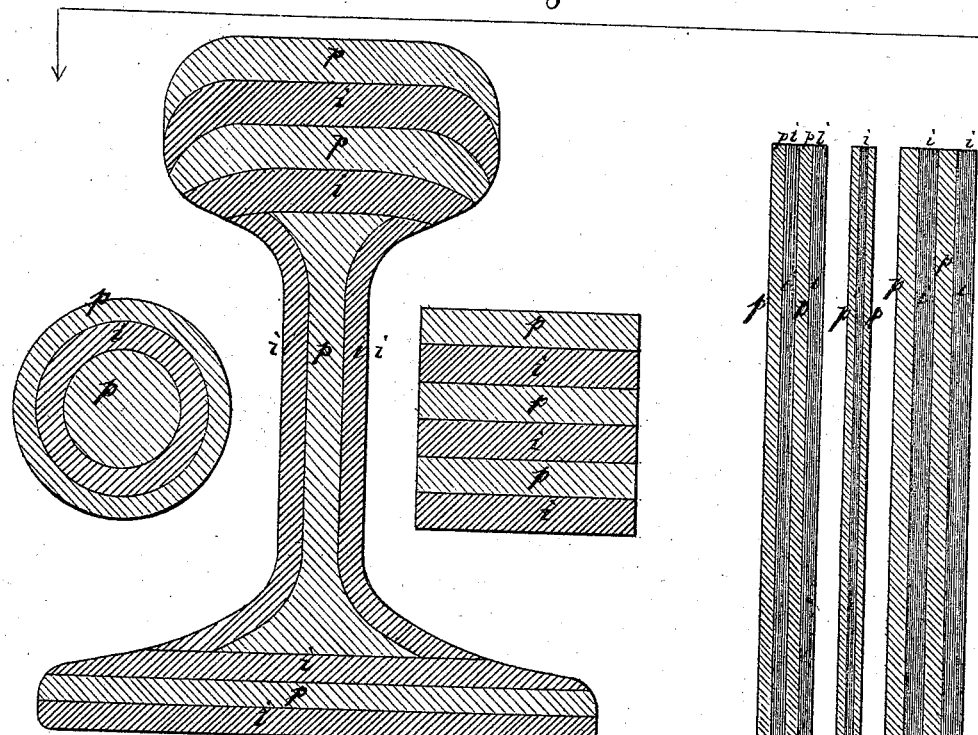

If I form a pile or fagot of case-hardened pneumatic metal and case-hardened wrought-iron in alternate layers and heat and roll the same, I produce bars, plates, sheets, or slabs, having interlayers of pneumatic metal and wrought-iron, as represented in the several cross-sections in Fig. 3, where the letters $i$ designate the case-hardened wrought-iron, and the letters $p$ the case-hardened pneumatic metal.

Figure 4:
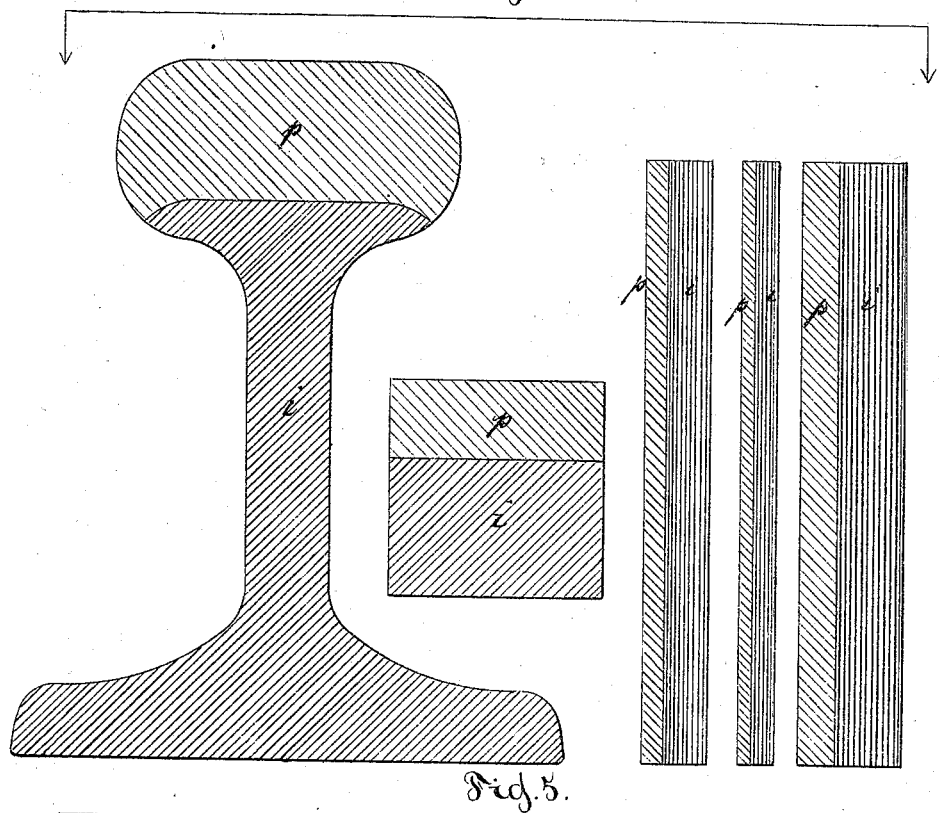

By piling or fagoting pieces of old iron rails or iron slabs or bars against the case-hardened side of a bar or slab of pneumatic iron and heating and rolling the same together into one body, I manufacture bars, plates, sheets, or slabs, having one side made of case-hardened pneumatic metal and the rest of wrought-iron, as represented in the several sections shown in Fig. 4, where the letters $i$ designate the wrought-iron, and the letter $p$ the pneumatic metal.

Figure 5:
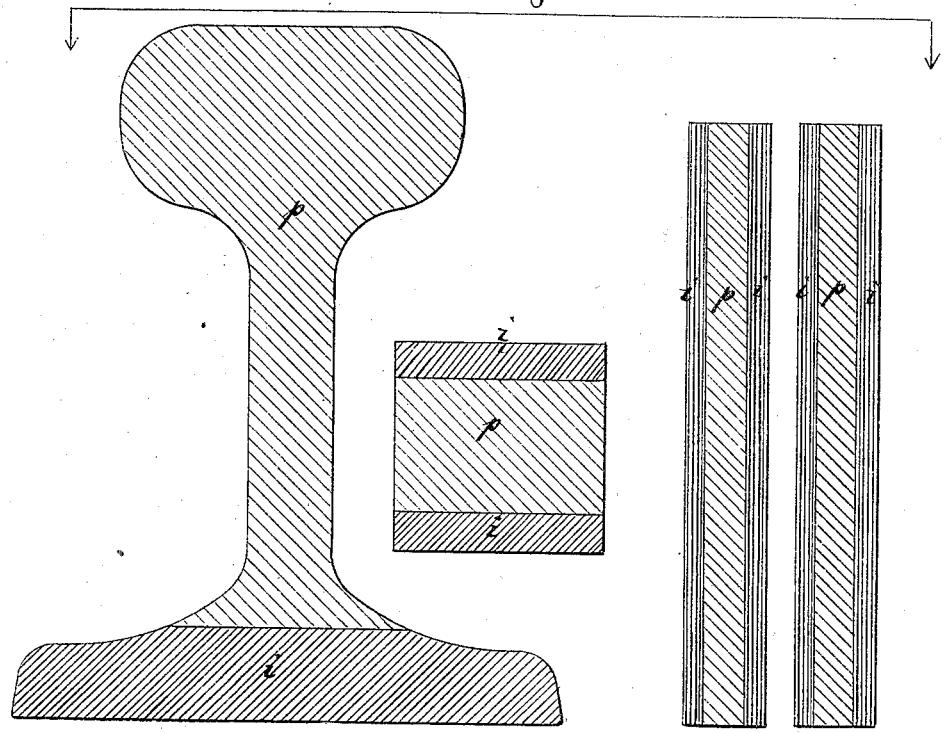

By piling or fagoting wrought-iron bars or plates against one or more case-hardened sides of a pneumatic bloom, and heating the whole to a welding heat and rolling it together, I produce bars, plates, sheets, or slabs of pneumatic metal, with one or more sides of wrought-iron, as represented in the several sections shown in Fig. 5, where the letters $i$ designate the wrought-iron, and the letter $p$ the pneumatic iron.

Figure 6:
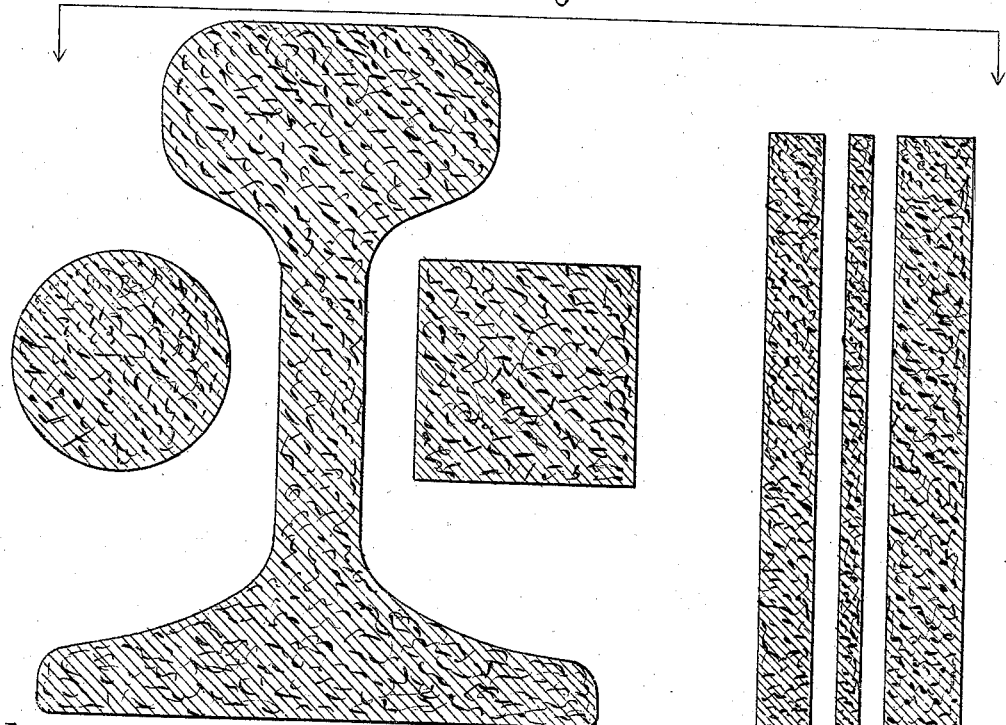

But, besides manufacturing bars, plates, sheets, or slabs by piling or fagoting case-hardened short bars or slabs, or short pieces of the same, and heating and rolling the said pile or fagot into one solid article of merchandise, as before stated, I also take ordinary scraps of wrought-iron or pneumatic metal in small and irregular pieces, such as may be found in any junk-shop, and submit the said irregular pieces of iron to the process of case-hardening, and, after having been case-hardened, I introduce the said pieces into a sheet-iron case or sleeve, inclosing them, so as to form a pile or fagot in the manner usually practiced for fagoting short pieces of iron; or, if the pieces of iron are long enough, they may be bound together by bands or straps to form a pile or fagot; and by heating this fagot to a welding heat and hammering or rolling the same into the desired shape, I produce bars, plates, sheets, or slabs, having an intermixed case-hardened body, which forms a damasked metallic texture, as represented in the several cross-sections, Fig. 6.

I also take pneumatic or wrought-iron bars, sheets, or slabs after having been passed through the roughening-rolls, or before they are submitted to the last passes of the finishing-rolls, and submit the same to the process of case-hardening, as before stated; then I submit them to the required heat in some suitable furnace and pass them through the finishing-rolls, according to the purpose for which said metal is to be used.

By case-hardening the iron, before it is finished through the few last passes of the rolls, I manufacture bars, plates, sheets, or slabs of pneumatic iron or wrought-iron, or of both metals combined, having their surfaces made of case-hardened iron, which greatly adds to the strength of the metal, and also serves, in a great measure, to protect the iron against oxidation.

In Fig. 7 I have shown several sections of such bars, and in these figures the letters $a$ designate the body of wrought-iron, and the letters $b$ the protecting layers of case-hardened metal surrounding said body.

The advantages to be derived from my invention are as follows: It is a well-known fact that pneumatic iron, generally known by the term of Bessemer steel, cannot be piled or fagoted the same as wrought-iron, since this metal does not possess the welding properties of wrought-iron. In the meantime there is a large accumulation of pieces of railway bars sawed from the ends of what are called solid Bessemer steel rails.

Furthermore, the so-called Bessemer steel rails require to be relaid at certain intervals of time, and on that account it is very important to impart to that metal welding properties to enable it to be piled or fagoted and rerolled in the same manner in which old wrought-iron rails are piled and rerolled into new railway bars or other forms of merchantable iron.

This object I accomplish by case-hardening the old pneumatic iron or Bessemer steel bars or pieces of such bars, as previously described; and I also facilitate materially the operation of rerolling old wrought-iron rails by revivifying their welding properties by subjecting them to a process of case-hardening, as above fully explained.

Furthermore, in the manufacture of railway bars of wrought-iron with heads made of pneumatic metal; or in the manufacture of solid railway bars of pneumatic metal with wrought-iron flanges; or in the manufacture of plates composed of pneumatic metal and wrought-iron for protecting vessels of war and fortifications; or of plates for making bank vaults and safes, and sheets for making steam-boilers, and for various other purposes, such as the construction of bridges, buildings, and steam-vessels; or for making agricultural implements—in all such cases it becomes very important that the pneumatic metal should be capable of being thoroughly welded to wrought-iron; and by subjecting the pneumatic metal to the process of case-hardening, I have succeeded to accomplish the desired result.

The same remarks apply to the process of rerolling old wrought-iron railway bars or wrought-iron scraps, which I can accomplish successfully by case-hardening such bars or scraps before they are piled or fagoted, thereby revivifying their welding properties.

My invention is also of great advantage in the manufacture of bars or skelps for making gun-barrels from a pile or fagot made of case-hardened iron, the iron being piled or fagoted in an oblique or spiral form.

By these means I obtain a metal presenting a surface surrounded with spirals or ribands, as shown in Fig. 8, at a comparatively small cost, where $a$ is the case-hardened iron. $b$ is the wrought-iron. The bars, having a spiral structure, may also be employed with advantage for shafts, braces, or bolts in the construction of bridges and various kinds of machinery.

When it is required to reroll old wrought-iron railway bars provided with heads of pneumatic metal, or old railway bars of pneumatic metal provided with wrought-iron flanges; or the sawed end pieces of new railway bars made of wrought-iron and pneumatic metal, I first separate the pneumatic metal from the wrought-iron by heating the rails or pieces of rails to a red or white heat, and passing them through rolls of such a shape as to produce deep grooves or indentations in the web of the rail, near to the head or near to the flange, as shown in Figs. 9 and 10, where the letters A designate the pneumatic metal, and the letters B the wrought-iron, and letters C the indentation or groove. By these means the separation of the wrought-iron portion of the rail from the portion made of pneumatic metal is materially facilitated. The same process can also be applied for the purpose of separating the heads of rails made entirely of pneumatic metal from their flanges, in preparing that metal for rerolling; and by piling or fagoting case-hardened pneumatic metal and wrought-iron together in alternate layers in an oblique or spiral form, then heating, hammering, or rolling the same into bars or tubes, I obtain a metal presenting a surface surrounded with spirals or ribands of intermixed metal, as shown in Fig. 11, where $a$ is the wrought-iron, and $b$ the pneumatic metal—such bars or tubes possessing great strength.

What I claim as new, and desire to secure by Letters Patent, is—

1. The within-described process of producing bars with case-hardened surfaces, by first subjecting the iron bars in a rough state to the process of case-hardening, then heating and passing them through the finishing-rollers, substantially in the manner set forth.

2. The within-described process of producing merchantable bars, plates, sheets, or slabs of wrought-iron or pneumatic metal, or both combined, by first subjecting the rough bars of iron to a process of case-hardening, then fagoting, reheating, and rerolling the same, substantially in the manner set forth.

3. A merchantable bar, plate, sheet, or slab composed of wrought-iron or of pneumatic-iron, when the bars of wrought-iron or of pneumatic-iron are first subjected to a process of case-hardening, and then reheated and passed through the finishing-rolls, substantially as set forth.

4. A mechantable bar, plate, sheet, or slab produced from bars of wrought-iron or of pneumatic-iron, or both combined, when said bars are first case-hardened, then fagoted, reheated, and rerolled, substantially in the manner described.

5. A merchantable bar, plate, sheet, or slab produced from a case-hardened pneumatic bar, bar plate, or billet piled against the side of a wrought-iron pile, heated and rolled into one body, substantially as represented in Fig. 4.

6. A merchantable bar, plate, sheet, or slab produced from a case-hardened pneumatic-iron bloom, and one or more bars or slabs of wrought-iron, piled, heated, and rolled into one body, substantially as represented in Fig. 5.

7. A merchantable bar, plate, sheet, or slab produced from a pile or fagot made of intermixed irregular pieces of case-hardened iron, heated and rolled into one body, substantially as represented in Fig. 6.

JOHN ABSTERDAM.

Witnesses:
W. HAUFF,
JAMES L. NORRIS.